United States Patent [19]

Conrad et al.

[11] 4,250,709

[45] Feb. 17, 1981

[54] IDLING ADJUSTING MECHANISM FOR INJECTION PUMPS, ESPECIALLY FOR DIESEL INJECTION PUMPS

[75] Inventors: Ulrich Conrad, Ludwigsburg; Gerd Niemeier, Stuttgart, both of Fed. Rep. of Germany

[73] Assignee: Daimler-Benz Aktiengesellschaft, Fed. Rep. of Germany

[21] Appl. No.: 924,300

[22] Filed: Jul. 13, 1978

[30] Foreign Application Priority Data

Jul. 14, 1977 [DE] Fed. Rep. of Germany ....... 2731913

[51] Int. Cl.[3] .......................... F03G 7/06; F02D 1/02; F02D 5/00

[52] U.S. Cl. ...................................... 60/527; 123/339; 60/528

[58] Field of Search ................. 60/527, 528, 529, 530, 60/531; 123/140 J, 140 MC, 102

[56] References Cited

U.S. PATENT DOCUMENTS

| | | | |
|---|---|---|---|
| 3,485,228 | 12/1969 | Updyke et al. | 123/140 MC |
| 3,529,770 | 9/1970 | Moody | 60/530 X |
| 3,540,479 | 11/1970 | Thompson | 60/527 X |
| 3,625,002 | 12/1971 | Davis | 60/528 |
| 4,098,249 | 7/1978 | Mowbray | 417/462 X |
| 4,099,506 | 7/1978 | Kolb | 123/140 J |
| 4,180,040 | 12/1979 | Hoter et al. | 123/140 J |

*Primary Examiner*—Allen M. Ostrager
*Attorney, Agent, or Firm*—Craig & Antonelli

[57] ABSTRACT

An idling speed adjusting mechanism for injection pumps in which a pivotal connection for raising the idling rotational speed is adjustable against a spring force by way of an adjusting mechanism arranged externally at the pump housing and adjustable against the spring force. The adjusting mechanism includes an adjusting motor formed in particular by an expansion element which is extensible with a temperature increase in the spring prestress direction. The adjusting motor is connected with the pivotal spring connection by way of an intermediate member displaceable between abutments fixed at the housing. The intermediate member, in turn, is spring-loaded with a temperature increase opposite the extension direction of the adjusting piston of the adjusting motor.

17 Claims, 2 Drawing Figures

Figure 1:
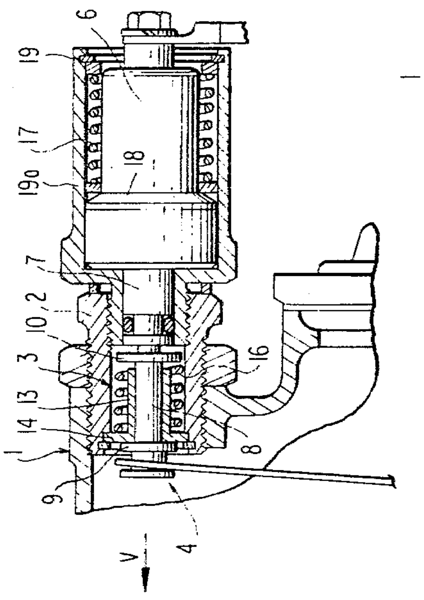

IDLING ADJUSTING MECHANISM FOR INJECTION PUMPS, ESPECIALLY FOR DIESEL INJECTION PUMPS

The present invention relates to an idling adjusting mechanism for injection pumps, especially for diesel injection pumps, in which a pivotal connection for raising the idling rotational speed is adjustable against a force, especially against a spring prestess force, by way of an adjusting mechanism arranged at the pump housing on the outside thereof and adjustable in, respectively, opposite this force.

In a known solution of this type, an adjusting screw serves the purpose of adjustment with the adjusting screw normally being adjusted during the testing of the pump and not adjusted thereafter. Additionally, and independently of this adjusting screw, an idling adjustment is provided with these prior art pumps, in which one engages into the control linkage of the pump for purposes of raising the idling rotational speed.

A solution is to be provided by the present invention which enables a temperature-dependent automatic increase of the idling rotational speed without engagement into the control linkage, whereby changes in the overall pump construction are to be avoided as much as possible and especially also no additional installation space for the pump should be necessitated.

According to the present invention, this is achieved with an idling adjusting mechanism of the aforementioned type in that the adjusting mechanism includes an expansion element extensible with a temperature increase, especially in the spring prestress direction, which expansion element is operatively connected with the pivotal spring connection by way of an intermediate member displaceable between limit abutments fixed at the housing, whereby the intermediate member is spring-loaded opposite the extension direction of the expansion element in case of a temperature increase. With this construction of the idling adjusting mechanism, it is possible to install the automatically operating adjusting mechanism practically in the place of the prior adjusting screw used heretofore since the pivotal spring connection can be displaced opposite the spring prestess direction as a result of the spring support of the intermediate member for raising the idling rotational speed, even though the requisite force cannot be produced by way of the expansion element in this direction.

It is appropriate in realization of the present invention if the intermediate member is formed by an adjusting rod with two oppositely disposed abutment collars, between which is located a part which is fixed at the housing and forms the limit abutments. This part is preferably formed by a bush which includes a radially outwardly projecting annular collar at one end thereof anchored in the housing and which forms with its two end faces the limit abutments.

With the two end faces of a bush forming the limit abutments and with the bush being disposed between the abutment collars of the adjusting rod, the radially outwardly projecting bush collar forms simultaneously the abutment for a spring which is arranged concentrically to the adjusting bush and which is supported against the abutment collar of the adjusting rod adjacent the expansion element, whereby this spring is so constructed and dimensioned that it can be overcome, on the one hand, by the pressure of the expansion element, and, on the other hand, with a decreasing temperature, effects a return of the expansion element and a displacement of the intermediate member into the position thereof corresponding to the raised idling rotational speed.

According to a further feature of the present invention, the expansion element, with a temperature increase, is appropriately springily supported with respect to the housing opposite its expansion or extension direction so that the function of the adjusting mechanism is also assured when the extension travel of the expansion element is larger than the adjusting path or travel limited by the abutments.

Accordingly, it is an object of the present invention to provide an idling adjusting mechanism for injection pumps, especially for diesel injection pumps, which avoids by simple means the aforementioned shortcomings and drawbacks encountered in the prior art.

Another object of the present invention resides in providing an idling adjusting mechanism for injection pumps, especially for diesel injection pumps, which is simple in construction as also reliable in operation.

A further object of the present invention resides in providing an idling adjusting mechanism for injection pumps of the type described above which operates completely automatically, obviating the need for adjustments, yet is simple in construction and requires relatively little space.

Still a further object of the present invention resides in providing an idling adjusting mechanism for injection pumps in which, for purposes of raising the idling rotational speed, an interaction into the control linkage of the pump is rendered unnecessary.

Another object of the present invention resides in providing an idling adjusting mechanism for injection pumps, especially for diesel injection pumps, which enables a temperature-dependent automatic increase of the idling rotational speed without the need to engage into the control linkage of the pump.

Another object of the present invention resides in providing an idling adjusting mechanism of the type described above which provides an automatic operation yet eliminates as much as possible any changes in the overall construction of the pump.

Figure 2:
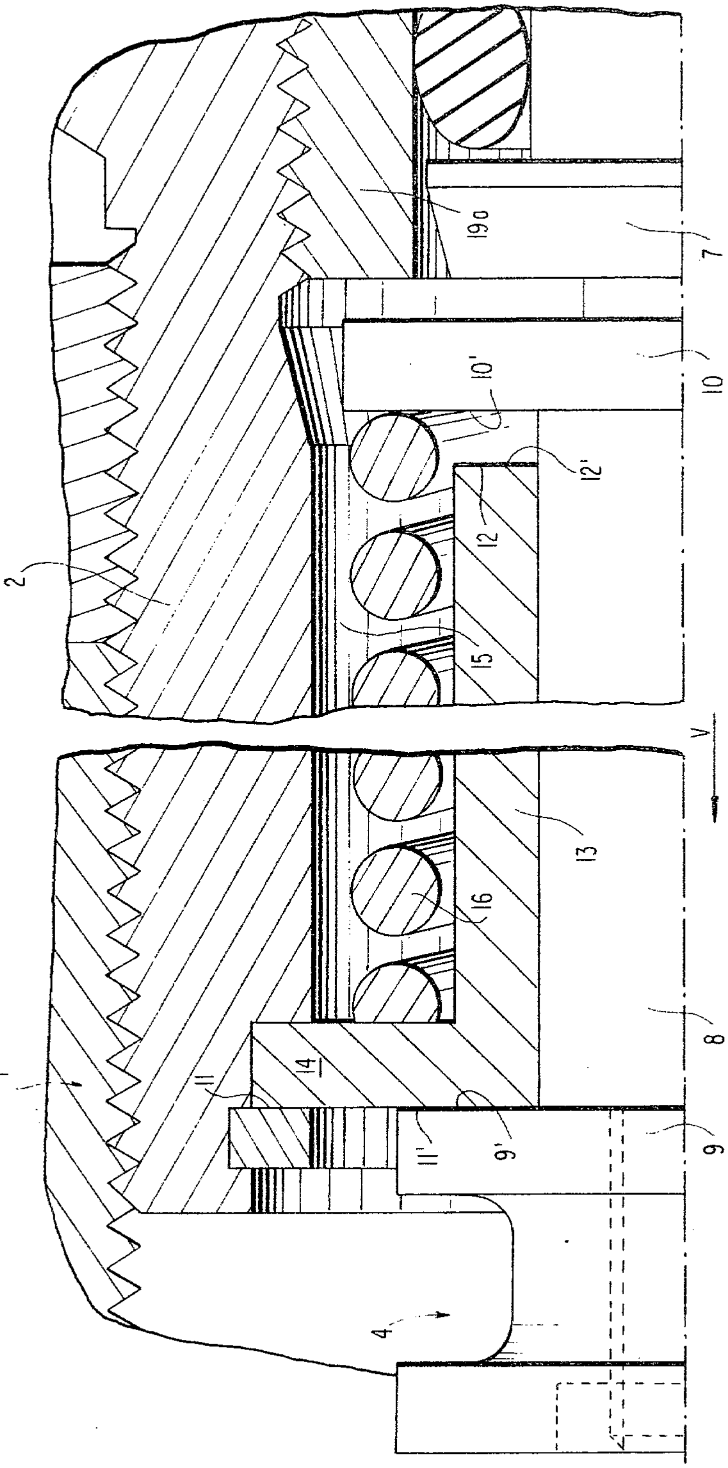

These and other objects, features and advantages of the present invention will become more apparent from the following description when taken in connection with the accompanying drawing which shows for purposes of illustration only, one embodiment in accordance with the present invention, and wherein:

FIG. 1 is a cross-sectional view of the idling speed adjusting mechanism according to the present invention, showing the adjusting mechanism in its entirety; and FIG. 2 is a partial cross-sectional view, on an enlarged scale, illustrating a detail of the idling speed adjusting mechanism according to the present invention.

Referring now to the drawing wherein like reference numerals are used throughout the two views to designate like parts, the part of the pump housing accommodating the control mechanism is generally designated by reference numeral 1 in FIGS. 1 and 2. A threaded bush 2 is screwed into the end face of the pump housing part 1. This threaded bush 2 serves as intermediate support for the adjusting mechanism according to the present invention generally designated by reference numeral 3 which is provided at its inner end disposed inside of the pump housing 1 with the pivotal spring connection generally designated by reference numeral 4. This pivotal spring connection 4 is adjustable axially, i.e., in the axial direction of the threaded bush 2 by the solution according to the present invention, whereby the spring is prestressed in the direction of the arrow V (FIG. 1) so that the spring seeks to displace the pivotal spring connection 4 in the direction of the arrow V. Two limit positions are thereby provided for the displacement of the spring connection 4, of which the forward limit position, in relation to the spring prestress direction according to arrow V, forms the normal position which exists with a warm engine and a correspondingly low idling rotational speed, whereas the rearward position of the pivotal spring connection 4, in relation to the direction of the arrow V, is provided for cold engine operation and for a correspondingly raised idling rotational speed. Abutments, as described more fully hereinafter, define the limit position of the pivotal spring connection, which must be displaced for increasing the rotational speed against the spring prestress (arrow V), and the pivotal spring connection 4 is displaceable temperature-dependent by way of an adjusting motor 6 within the range limited by these abutments, whereby the adjusting motor 6 is formed within the scope of the solution according to the present invention preferably by an expansion element of any conventional construction having an adjusting piston 7 which is extensible with an increasing temperature in the direction of the arrow V.

The extension direction of the expansion element of the adjusting motor 6 with a temperature increase thus corresponds to the prestress direction of the spring, i.e., direction of arrow V.

For purposes of increasing the idling rotational speed, the pivotal spring connection 4, however, has to be displaced opposite the spring prestress direction, i.e., opposite the direction of arrow V. However, no force can be produced in this direction by way of the expansion element of the adjusting motor 6. Consequently, an adjusting rod 8 (FIG. 2) is provided within the scope of the solution according to the present invention between the adjusting motor 6 and the pivotal spring connection 4 and serves as an intermediate member which is equipped with mutually oppositely disposed abutment collars 9 and 10 whereby the abutment collar 9 faces the pivotal spring connection 4 and the abutment collar 10 faces the adjusting piston 7 of the adjusting motor 6. The mutually facing end faces of the abutment collars 9 and 10 form abutment surfaces 9′ and 10′ (FIG. 2) which cooperate with fixed abutment surfaces 11′ and 12′ fixed at the pump housing 1 with these abutment surfaces 11′, 12′ being formed by the end faces 11 and 12 of a bush 13 which coaxially surrounds the adjusting rod 8 between the abutment collars 9 and 10 and which, at its end facing the abutment collar 9, includes a radially outwardly extending annular collar 14 securely anchored in the threaded bush 2 as a part fixed in the pump housing 1. An annular space 15 remains between the bush 13 and the threaded bush 2 which is closed off at one end face by the annular collar 14 and, at the other end face, by the abutment collar 10 which projects radially into the annular space 15 and extends up to near the inner circumference of the threaded bush 2. The abutment collar 10, which radially outwardly overlaps the bush 13, can thus form an abutment for a spring 16 which is arranged coaxially to the adjusting rod 8 and the bush 13. The spring 16 is constructed as a compression spring, by means of which the adjusting rod 8 forming the intermediate member is spring-loaded in the direction toward its rearward position opposite the direction of arrow V so that the abutment surfaces 9′ and 11′ come into mutual abutment and the pivotal spring connection 4 assumes its position corresponding to the increased idling rotational speed. If the expansion element used as adjusting motor 6 is warmed-up, then the adjusting piston 7 thereof is extended and the adjusting rod 8 is displaced against the spring-load by the spring 16 until the position of the pivotal spring connection 4 is reached which corresponds to the normal idling rotational speed with a warm engine. This position is characterized and determined by the support of the adjusting rod 8 with its abutment surface 10′ at the abutment surface 12′ of the housing fixed bush 13.

In order to avoid the necessity of matching the extension length of the expansion element of the adjusting motor 6 to the displacement path of travel of the pivotal spring connection 4, the expansion element of the adjusting motor 6 is supported according to the present invention opposite the spring prestress direction (arrow V) by way of a spring 17 (FIG. 1) which, on the one hand, abuts at a shoulder 18 (FIG. 1) of the expansion element and to which, on the other, is coordinated an abutment ring 19 which is fixed with respect to a mounting bush 19*a* which receives the adjusting motor 6 and by way of which the adjusting motor 6 is connected with the threaded bush 2, for which purpose the mounting bush 19*a* is screwed into the threaded bush 2. The dimensions and characteristics of the springs 16, 17 are such in the construction according to the present invention that the return force of the spring 16 is greater than the oppositely acting prestress force (arrow V) of the spring engaging at the pivotal spring connection 4. Furthermore, the spring 17 is constructed stronger than the spring 16 so that the spring 17 responds only when the extension position corresponding to the normal idling rotational speed is reached by the expansion element of the adjusting motor 6, i.e., the adjusting piston 7, and if in this extended position the maximum extension length of the adjusting piston 7 has not yet been reached so that for the rest of the extension path or travel thereof the expansion element of the adjusting motor 6 can escape toward the rear against the force of the spring 17 with a stationary adjusting piston. The warm-up of the expansion element of the adjusting motor 6 takes place electrically in the solution according to the present invention and is controlled in a manner not illustrated in detail herein by conventional means in dependence on time or by way of a temperature switch which may be located in the cooling system of the engine. Possibly, within the scope of the present invention, the expansion element of the adjusting motor 6 can also be controlled both in a time-dependent and temperature-dependent manner by the use of appropriate means known in the art.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An idling speed adjusting mechanism comprising:

an adjusting motor having an adjusting piston, said adjusting piston having an extension direction and operable to be extended with a temperature increase;

connecting means having a force applied thereto in said extension direction;

an intermediate member displaceable between relatively fixed abutment means and operatively connecting the adjusting motor to said connecting means;

spring means operable to displace the intermediate member in a direction opposite said extension direction.

2. An idling speed adjusting mechanism according to claim 1, characterized in that said force is a spring prestress force and in that the adjusting motor is extensible in a spring prestress direction.

3. An idling speed mechanism according to claim 2, characterized in that the adjusting motor includes an expansion element.

4. An idling speed ajusting mechanism according to claim 3, characterized in that the connecting means includes a pivotal spring connection.

5. An idling speed adjusting mechanism with a housing according to one of claims 1, 2 or 3, characterized in that the intermediate member is formed as an adjusting rod having two mutually oppositely disposed abutment collars, a part fixed at the housing is located between the abutment collars, and in that portions of the fixed part form said abutment means.

6. An idling speed adjusting mechanism according to claim 5, characterized in that the fixed part is a bush means and includes at one end thereof a radially outwardly projecting annular collar securely anchored in the housing.

7. An idling speed adjusting mechanism according to claim 6, characterized in that the spring means operable to displace the intermediate member is arranged between the annular collar and one of the abutment collars of the adjusting rod is coordinated to the adjusting piston.

8. An idling speed adjusting mechanism according to claim 7, characterized in that a force applying means is operatively connected with the adjusting rod at an end opposite the adjusting motor.

9. A idling speed adjusting mechanism according to claim 7, characterized in that further spring means are provided for springily supporting the adjusting motor in a direction opposite the extension direction of the adjusting piston.

10. An idling speed adjusting mechanism according to claim 9, characterized in that the adjusting motor is formed by a heatable expansion element.

11. An idling speed adjusting mechanism according to claim 10, characterized in that means are provided for electrically heating the expansion element.

12. An idling speed adjusting mechanism according to one of claims 1, 2 or 3, characterized in that the abutment means includes a fixed annular collar, the intermediate member includes an abutment collar coordinated to the adjusting piston, and in that the spring means operable to displace the intermediate member is arranged between the fixed annular collar and the abutment collar of the intermediate member.

13. An idling speed adjusting according to one of claims 1, 2 or 3, characterized in that further spring means are provided for springily supporting the adjusting motor in a direction opposite the extension direction of the adjusting piston.

14. An idling speed adjusting mechanism according to claim 1, 2 or 3, characterized in that the adjusting motor is formed by a heatable expansion element.

15. An idling speed ajusting mechanism according to claim 14, characterized in that means are provided for electrically heating said expansion element.

16. An idling speed adjusting mechanism according to one of claims 1, 2, 3, or 4, characterized in that the intermediate member is formed as an adjusting rod, and in that a force applying means is operatively connected with the adjusting rod at an end thereof opposite the adjusting motor.

17. An idling speed adjusting mechanism according to claim 16, characterized in that the force applying means is formed as a pivotal spring connection.

* * * * *